June 26, 1951  M. DOERHOFF  2,558,347
BRACKET
Filed Nov. 12, 1947  2 Sheets-Sheet 1
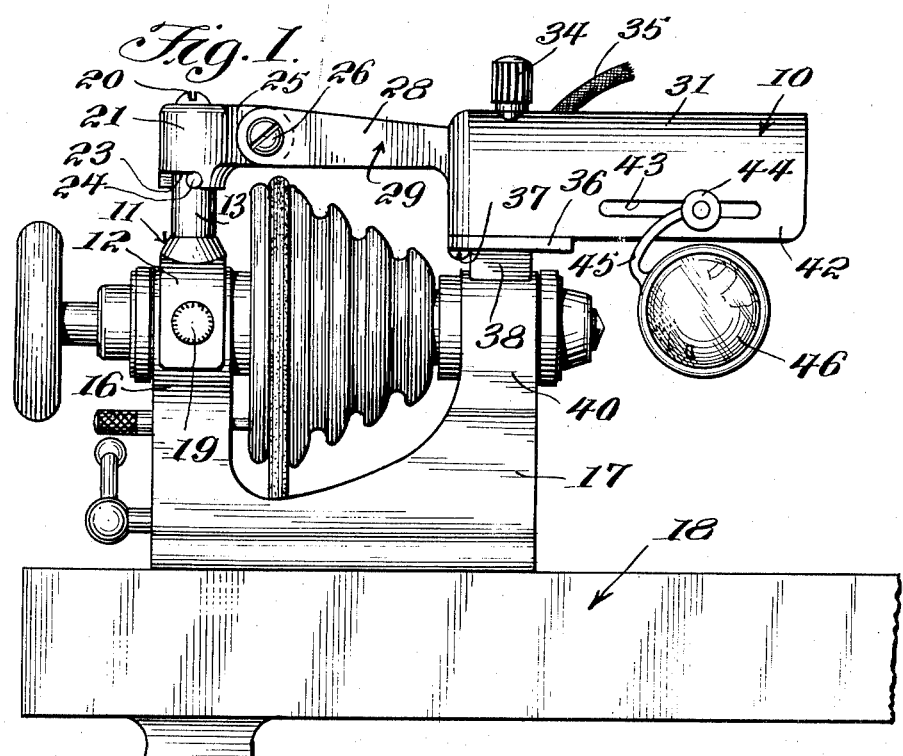
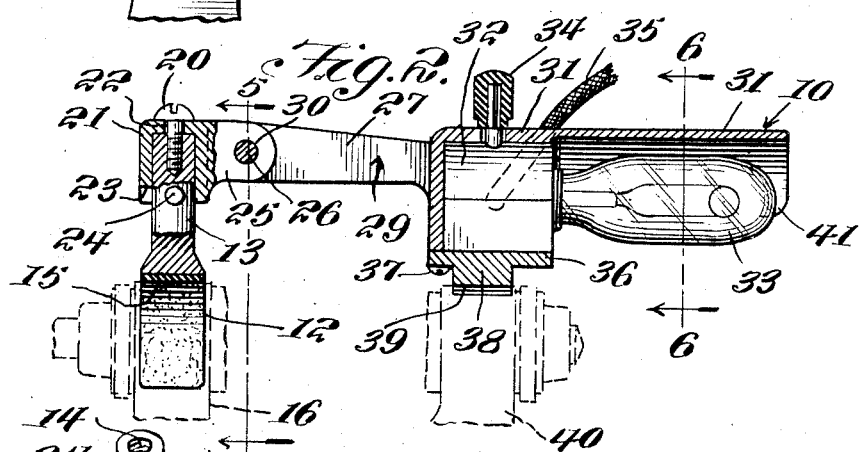
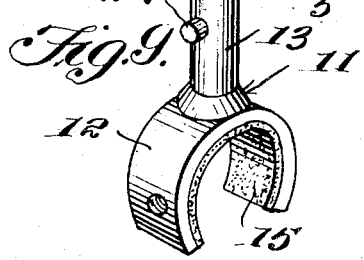
INVENTOR.
Martin Doerhoff,
BY Victor J. Evans & Co.
ATTORNEYS

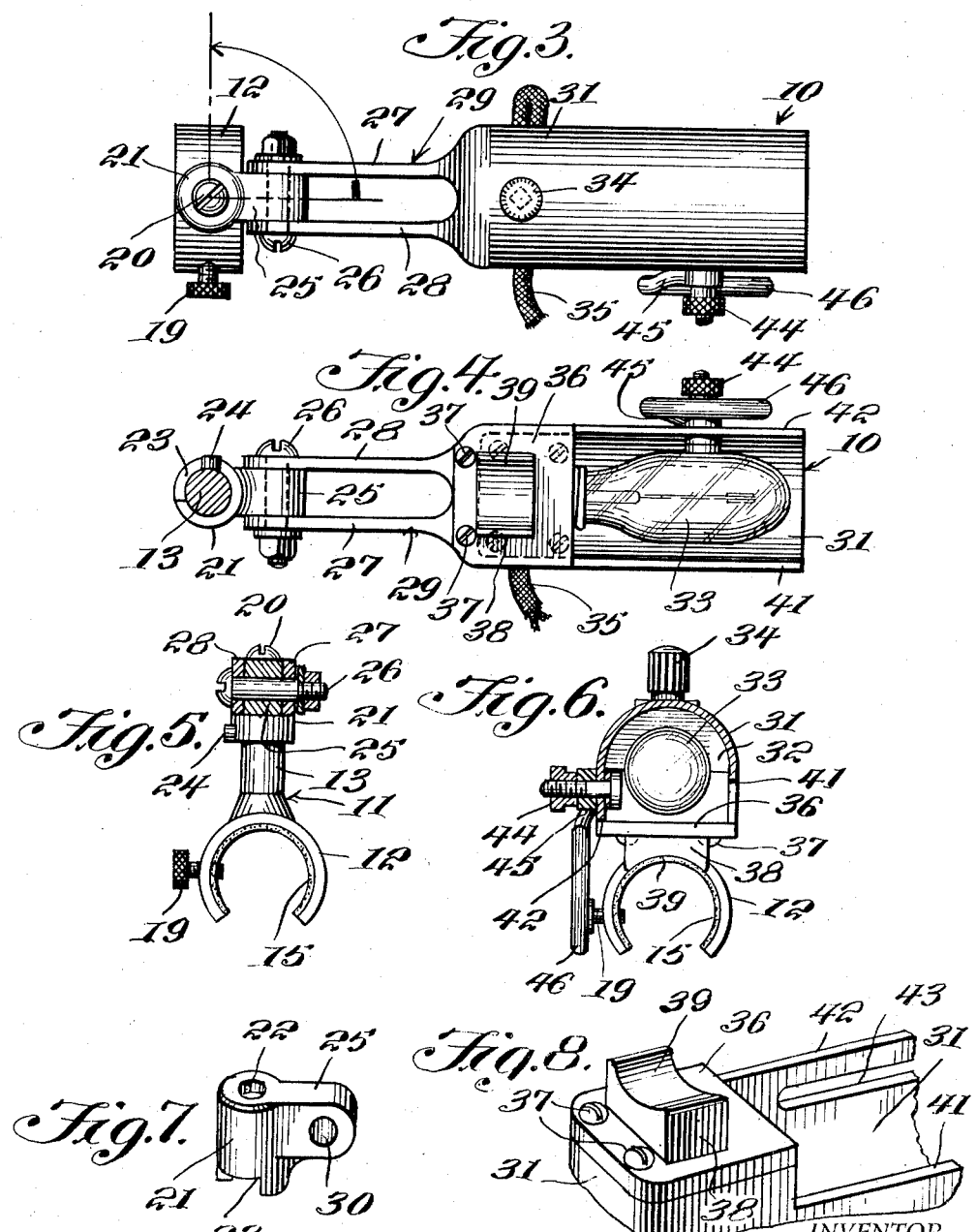

Patented June 26, 1951

2,558,347

UNITED STATES PATENT OFFICE 2,558,347

BRACKET

Martin Doerhoff, Centralia, Ill.

Application November 12, 1947, Serial No. 785,285

1 Claim. (Cl. 248—278)

This invention relates to a combination lamp and magnifying lens for use on standard watchmakers' lathes.

An object of the invention is to provide a device of this character that can be applied to nearly all of the various types of watchmakers' lathes, and will enable the watchmaker to have better light and an enlarged view of the small parts upon which he is working.

Another object of the invention is to provide a device which is easily mounted on or dismounted from a watchmaker's lathe.

Another object of the invention is to provide a device employing a magnifying lens that can be adjusted to position the lens with regard to the part in the watchmaker's lathe.

This invention eliminates the watchmaker's having to wear magnifying glasses or an eye piece while working on the lathe.

With the above and other objects and advantages in view, the invention consists of the novel details of construction, arrangement and combination of parts more fully hereinafter described and illustrated in the accompanying drawings in which:

Figure 1 is an elevational view of an embodiment of the invention mounted on a watchmaker's lathe;

Figure 2 is a view partly in longitudinal section and partly in elevation of the device, per se;

Figure 3 is a top plan view of the device;

Figure 4 is a bottom plan view thereof partly in section;

Figure 5 is a sectional view on the line 5—5 of Figure 2;

Figure 6 is a sectional view on the line 6—6 of Figure 2;

Figure 7 is a perspective view of the arm bearing cap;

Figure 8 is a fragmentary perspective view of the housing on the free end of the arm and Figure 9 is a perspective view of the rear bearing clamp for the arm.

Referring more in detail to the drawings, the reference numeral 10 designates the assembly embodying the invention. The assembly 10 comprises the rear bearing mounting or pivot clamp 11 which is provided with a semi-circular shaped clamp portion 12. Formed on the summit of the clamp, in vertical relation thereto, is a post 13 which, at the top thereof, is provided with a tapped bore 14.

The clamp portion 12 is lined with a flexible pad 15, so that the clamp will fit the housing of the rear bearing 16 on the head stock 17 of the lathe 18. A set screw 19, carried by the clamp portion 12, permits the clamp portion to be fixed on the housing of the rear bearing 16.

Mounted for movement on the post 13, about the axis provided by the screw 20, is the arm bearing cap 21. The screw 20 passing through the smooth bore 22 in the cap is received in the tapped bore 14 of the post 13 to rotatably mount the cap on the post. The lower peripheral edge of the cap 21 is cut away to form the limiting guideway 23 which, engaging the stud 24 in the post 13, limits the movement of the cap on the post 13. Extending from the cap 21, at right angles thereto, is the bearing 25, on which are mounted by means of a bolt 26, the parallel spaced sections 27 and 28 respectively of the arm 29. The bolt 26 being received in the bore 30 in the bearing 25 forms a pivot for the arm 29. Formed on the opposite or free ends of the arm 29 is a semi-cylindrical shaped housing 31, in which is mounted, at the rear end thereof, the electrical switch controlled socket 32 for the bulb 33. The socket is provided with a switch knob 34, which extending outwardly of the housing 31 controls the illumination of the bulb 33. A cable 35 connected to the socket 32 is adapted to be connected to a source of electrical current in the conventional manner. A plate 36 secured to the housing 31, by screws 37, places the plate below the socket 32, to retain the socket in the housing 31. The plate 36, centrally of the lower face, is provided with a support 38 having a curved lower face 39, which rests on the front bearing housing 40 of the head stock 17 of the lathe to support the housing 31.

The housing 31 forms a hood for the bulb 33 and one edge 41 is higher than the opposite edge 42, to permit the bulb to illuminate the parts placed in the lathe.

Above the edge 42, parallel therewith, is an elongated slot 43, which receives the bolt 44 on which is mounted the curved arm 45 formed integral with the magnifying lens 46. The bolt 44 permits the arm to rotate on the bolt for adjustment of the lens 46, and also permits the arm to be slid longitudinally of the slot 43 for adjustment of the lens with regard to the work in the lathe.

In mounting the attachment on the head stock of the lathe, the clamp 12 is positioned as shown in Figure 1, the screw 19 is tightened, and the attachment is fixed to the head stock. In use, the attachment is in the position shown in Figure 1. When its use is not desired, the arm carrying the housing 31 can be swung away from the lathe so that it will not interfere with work on the lathe.

In use, the bulb is energized to illuminate the work, and the lens is adjusted so that the work can be clearly observed through the lens.

The attachment can be mounted on lathes of various sizes and will prove of great benefit to the user of the lathe.

It is believed that from the foregoing description, the construction and operation of the attachment will be apparent to those skilled in the art, and it is to be understood that changes in the minor details of construction, arrangement and combination of parts may be restored to, provided they fall within the spirit of the invention and the scope of the appended claim.

Having thus described the invention, what is claimed as new and desired to be secured by Letters Patent is:

A mounting bracket comprising a semi-circular shaped clamp portion, a post rising from the summit of said clamp portion in vertical relation thereto, a tapped bore in the upper end of the post, means carried by the clamp for fixing the clamp to one portion of a support and a flexible pad on the inside of the clamp to prevent damage to the support, an apertured cap member mounted for movement on the upper end of the post, means passing through the cap into the bore in the post to retain the cap on the post, a stud in the post and said cap having a cutout portion therein adapted to engage said stud to limit the movement of the cap, a bearing member integral with the cap and extending at right angles thereto, an arm comprising two parallel spaced sections pivotally connected to said bearing, a semi-cylindrical shaped housing fixed to the outer ends of the sections of said arm a plate connected to said housing, and a support on the undersurface of said plate centrally thereof having a curved lower face for engaging and supporting said housing on a second portion of said first mentioned support.

MARTIN DOERHOFF.

REFERENCES CITED

The following references are of record in the file of this patent:

UNITED STATES PATENTS

| Number | Name | Date |
|---|---|---|
| 773,188 | Boast | Oct. 25, 1904 |
| 972,480 | Southwick | Oct. 11, 1910 |
| 1,175,274 | Klorer | Mar. 14, 1916 |
| 1,224,463 | Hawthorne | May 1, 1917 |
| 1,272,842 | Otte | July 16, 1918 |
| 1,309,360 | Klorer | July 8, 1919 |
| 1,580,316 | Moreton | Apr. 13, 1926 |
| 1,735,949 | Brady | Nov. 19, 1929 |
| 1,756,942 | Eddy et al. | May 6, 1930 |
| 2,104,198 | Jones | Jan. 4, 1938 |
| 2,226,417 | Sims | Dec. 24, 1940 |
| 2,388,474 | Ellis | Nov. 6, 1945 |
| 2,394,231 | Burski | Feb. 5, 1946 |